(12) United States Patent
Yonemochi et al.

(10) Patent No.: US 7,851,079 B2
(45) Date of Patent: Dec. 14, 2010

(54) BATTERY PACK AND PORTABLE ELECTRONIC DEVICE

(75) Inventors: Kenshin Yonemochi, Kamakura (JP); Seita Horikoshi, Beijing (CN)

(73) Assignee: Lenovo (Singapore) Pte. Ltd., Tech Park (SG)

(*) Notice: Subject to any disclaimer, the term of this patent is extended or adjusted under 35 U.S.C. 154(b) by 193 days.

(21) Appl. No.: 12/045,582

(22) Filed: Mar. 10, 2008

(65) Prior Publication Data

US 2008/0220321 A1   Sep. 11, 2008

(30) Foreign Application Priority Data

Mar. 9, 2007   (JP) ............... 2007-059503

(51) Int. Cl.
H01M 2/12  (2006.01)
H01M 2/10  (2006.01)
H01M 2/08  (2006.01)
H01M 6/42  (2006.01)

(52) U.S. Cl. .............. 429/89; 429/62; 429/99; 429/151; 429/156; 429/185

(58) Field of Classification Search .......... 429/89, 429/99, 185, 159, 120, 136, 153, 176, 100
See application file for complete search history.

(56) References Cited

U.S. PATENT DOCUMENTS

| | | | | |
|---|---|---|---|---|
| 2,636,063 A | * | 4/1953 | Schroeder | 429/54 |
| 3,715,239 A | * | 2/1973 | Gillman et al. | 429/54 |
| 4,507,368 A | * | 3/1985 | Hashimoto | 429/62 |
| 5,571,630 A | * | 11/1996 | Cheiky | 429/26 |
| 6,159,630 A | * | 12/2000 | Wyser | 429/57 |
| 2002/0028374 A1 | * | 3/2002 | Yoshida et al. | 429/94 |
| 2003/0064283 A1 | * | 4/2003 | Uemoto et al. | 429/149 |
| 2005/0117286 A1 | * | 6/2005 | Karashima et al. | 361/683 |

FOREIGN PATENT DOCUMENTS

| | | |
|---|---|---|
| JP | 07-169452 | 7/1995 |
| JP | 08-293327 | 11/1996 |
| JP | 2000-21370 | 1/2000 |
| JP | 2000-67840 | 3/2000 |
| JP | 2006185894 A * | 7/2006 |

OTHER PUBLICATIONS

Machine Translation of JP 2006/185894A, Nakano, Hisako, Jul. 2006.*

* cited by examiner

*Primary Examiner*—Jonathan Crepeau
*Assistant Examiner*—Kenneth Douyette
(74) *Attorney, Agent, or Firm*—Kunzler Needham Massey & Thorpe

(57) ABSTRACT

The present invention includes a plurality of battery cells, each provided with a gas discharge valve. A housing accommodates the battery cells and has a gas opening. The housing does not melt at an inside temperature of the battery pack increased by gas discharged from the gas discharge valve. A blocking member blocks the gas opening and melts at the inside temperature of the battery pack increased by the gas discharged from the gas discharge valve, breaching the gas opening.

20 Claims, 7 Drawing Sheets

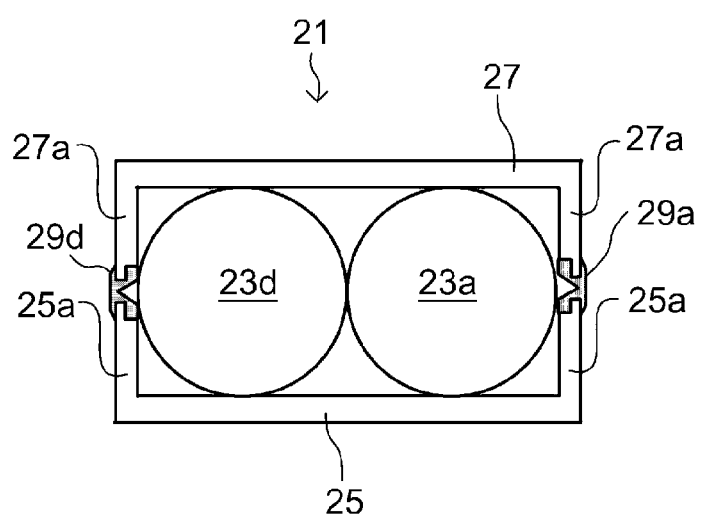
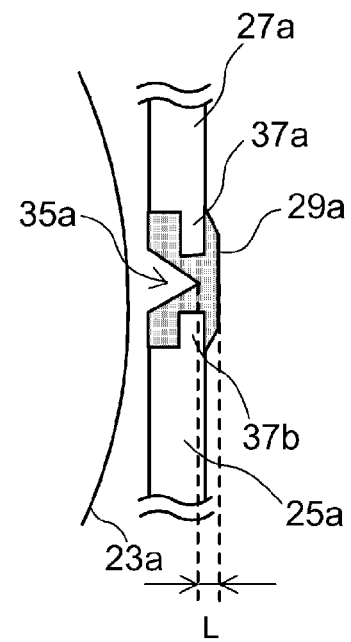
FIG. 3A       FIG. 3B
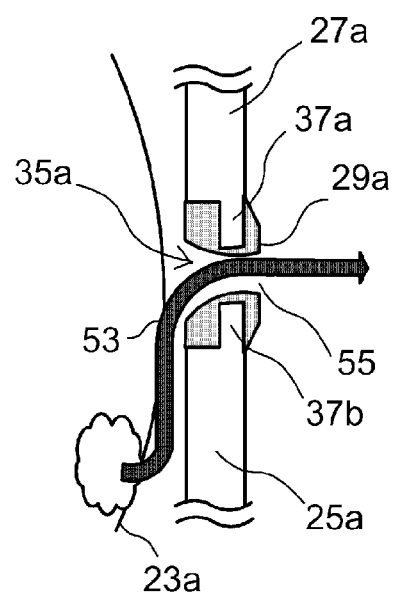
FIG. 4

BATTERY PACK AND PORTABLE ELECTRONIC DEVICE

CROSS-REFERENCES TO RELATED APPLICATIONS

This application claims priority to Japanese Patent Application Number 2007-059503 entitled "BATTERY PACK AND PORTABLE ELECTRONIC DEVICE" and filed on Mar. 9, 2007 for Kenshin Yonemochi et al., which is incorporated herein by reference.

BACKGROUND OF THE INVENTION

1. Field of the Invention

The present invention relates to improving safety of a battery pack used in a portable electronic device and, more particularly, to improving safety against a rapid increase of inside temperature of the battery pack.

2. Description of the Related Art

As the function and performance of portable electronic devices, such as notebook computers, hereinafter referred to as a notebook PC, and mobile phones, have improved, the power consumption of portable electronic devices has also increased. Accordingly, the energy density of portable electronic device batteries has further increased. In order to obtain a voltage suitable for an operation of the portable electronic device, a battery used for a portable electronic device is often in the form of a battery pack having a plurality of battery cells accommodated in a housing, with the battery cells connected to one another in a combination of series and parallel connections.

Batteries using a water-soluble electrolyte, such as a nickel cadmium (Ni-Cd) battery or a nickel hydrogen (NiMH) battery, are often used. In addition, lithium ion (Li-ion) batteries with excellent mass energy density and volume energy density have been recently adopted. In the lithium ion battery, cobalt acid lithium is used for a positive electrode, a carbon material is used for a negative electrode, and an organic electrolyte obtained by dissolving lithium salt in a combustible organic solvent is used as an electrolyte. The organic electrolyte is used because lithium reacts with water. Accordingly, a case or a metal jacket is employed to form a cell that structurally seals the lithium ion battery.

In the water-soluble electrolyte battery, even if cell voltage and temperature increase during electric charging thereby resolving the electrolyte and generating oxygen gas, the oxygen returns to original water due to the oxygen cycle or a catalyst plug. However, an electrolyte of the lithium ion battery cell does not return to an original state once the electrolyte is resolved. Accordingly, if the charging voltage or charging current of a lithium ion battery reaches a critical value or the lithium ion battery is used under abnormal conditions that increase the temperature, the electrolyte is resolved and gas is generated. As a result, the internal pressure increases. For this reason, a gas discharge valve is provided on the lithium ion battery in order to prevent explosion.

Typically a battery pack may be configured as a hard pack in which a battery cell is accommodated in a hard plastic case or as a soft pack in which a battery cell is packed within a heat-shrinkable tube. When a plurality of cells is accommodated, the hard pack is often adopted because it is easy. In a hard pack in which a plurality of lithium ion battery cells are accommodated, a protection circuit is generally provided. The protection circuit monitors a charging current, a charging voltage, the temperature of a cell, and the like and cuts off a charging circuit as required. An intelligent battery system may include a protection circuit for accurately measuring residual battery capacity, a controller, and various kinds of sensors incorporated in the battery pack for measuring and controlling charge and discharge.

In many cases, a battery pack mounted in a notebook PC constitutes a part of a housing of the body of the notebook PC. In addition, in order to increase a space where battery cells are accommodated, a so-called extension-type battery pack in which a part of a housing protrudes from the notebook PC may also be adopted.

When a user uses a notebook PC inside an office, it is common to carry the notebook PC between a conference room and each office without putting the notebook PC in a case or a bag. Accordingly, the notebook PC might be accidentally dropped onto the floor. A strong impact on a battery pack may cause short-circuiting or breakage of an internal circuit of a battery cell. As a result, the temperature of the cell may rise rapidly, and a high-temperature combustible gas might be discharged from a gas discharge valve into the battery pack.

When the battery cell is exposed to high-temperature combustible gas, the inside temperature of the battery pack goes up. As a result, more combustible gas may be emitted from the gas discharge valve. The high-temperature combustible gas that has been emitted may be ignited by an electrical circuit inside the battery pack or may spontaneously combust due to high temperature. Since a plurality of battery cells is densely accommodated in a battery pack, there is also a risk that another battery cell will be heated by the high-temperature combustible gas, causing more combustible gas to be discharged from the heated battery cells, and the temperature inside the housing to increase, and as a result, all battery cells accommodated in the battery pack may combust. In addition, the heat energy of the discharged gas is increased as the battery cells approaches a fully charged state, which increases the risk of combustion.

SUMMARY OF THE INVENTION

From the foregoing discussion, there is a need for a battery pack with improved gas discharge. Beneficially, such a battery pack would allow gas discharge when an internal battery pack temperature is increased.

The present invention has been developed in response to the present state of the art, and in particular, in response to the problems and needs in the art that have not yet been fully solved by currently available gas discharge methods. Accordingly, the present invention has been developed to provide a battery pack and portable electronic device that overcome many or all of the above-discussed shortcomings in the art.

The present invention includes a plurality of battery cells, each provided with a gas discharge valve. A housing accommodates the battery cells and has a gas opening. The housing does not melt at an inside temperature of the battery pack increased by gas discharged from the gas discharge valve. A blocking member blocks the gas opening and melts at the inside temperature of the battery pack increased by the gas discharged from the gas discharge valve, breaching the gas opening.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention allows gas discharge from a battery pack, improving the safety of portable electronic devices. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3A is a side view illustrating an embodiment of the battery pack of the present invention;

FIG. 3B is a side view illustrating an embodiment of the battery pack of the present invention;

FIG. 4 is a side view illustrating an embodiment of behavior of the battery pack when gas is discharged from a battery cell of the present invention;

DETAILED DESCRIPTION OF THE INVENTION

Figure 1A:
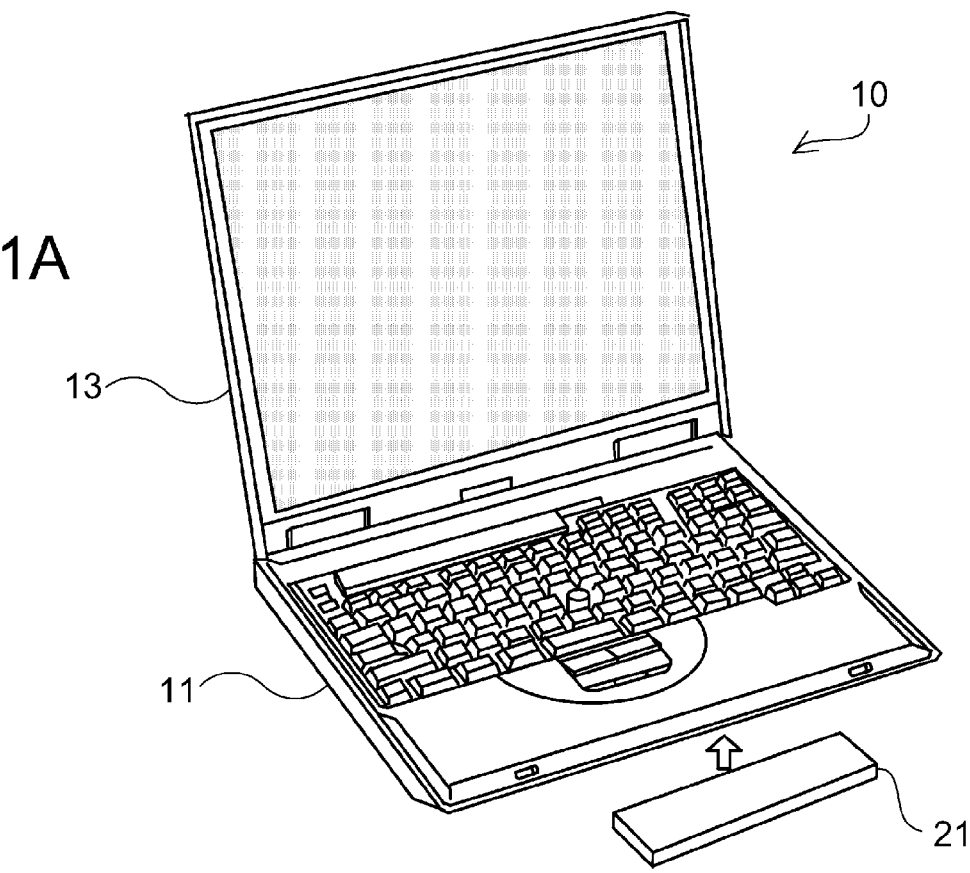
FIG. 1A is a perspective view of a notebook PC of an embodiment of the present invention.
Figure 1B:
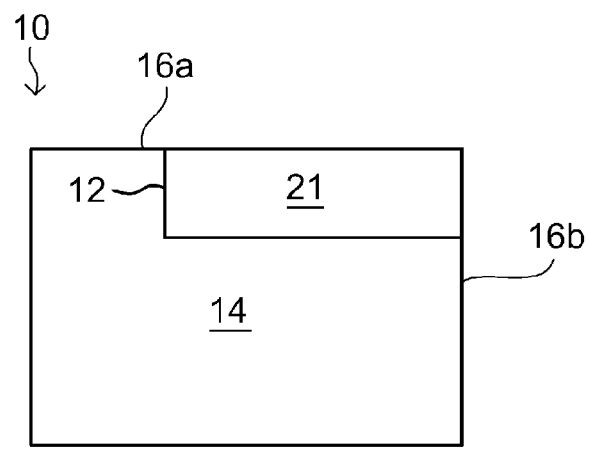
FIG. 1B is a bottom view of a notebook PC of an embodiment of the present invention.

FIGS. 1A and 1B are views illustrating a notebook PC 10 according to an embodiment of the present invention. FIG. 1A is a perspective view with the notebook PC 10 open, and FIG. 1B is a bottom view illustrating a bottom surface 14 of a main housing 11 where a battery pack 21 is mounted in the notebook PC 10. The notebook PC 10 is configured to include the main housing 11, which has a surface on which a keyboard and a pointing device are mounted and in which other devices may be accommodated, and a display-side housing 13 having a surface on which a liquid crystal display (LCD) is mounted. The display-side housing 13 is openably and closably attached to the main housing 11. In addition, a battery bay 12 is formed at a rear side of the bottom surface 14 of the main housing 11, and the battery pack 21 is housed in the battery bay 12.

If a battery pack 21 is not housed in the battery bay 12, the battery bay 12 is vacant. In a state where the notebook PC 10 is covered by closing the display-side housing 13, an approximately rectangular parallelepiped shape formed by the bottom surface 14 of the main housing, a surface obtained by extending side surfaces 16a and 16b of the main housing in order to cover a vacant portion of the battery bay, and other surfaces exposed to the outside of the notebook PC 10 forms the outline of the body of the notebook PC 10. When the battery pack 21 is housed in the battery bay 12, the side surfaces 16a and 16b of the main housing and a part of a housing of the battery pack 21 are located on approximately the same plane as the bottom surface 14 to form a part of an outline of the notebook PC 10.

Figure 2A:
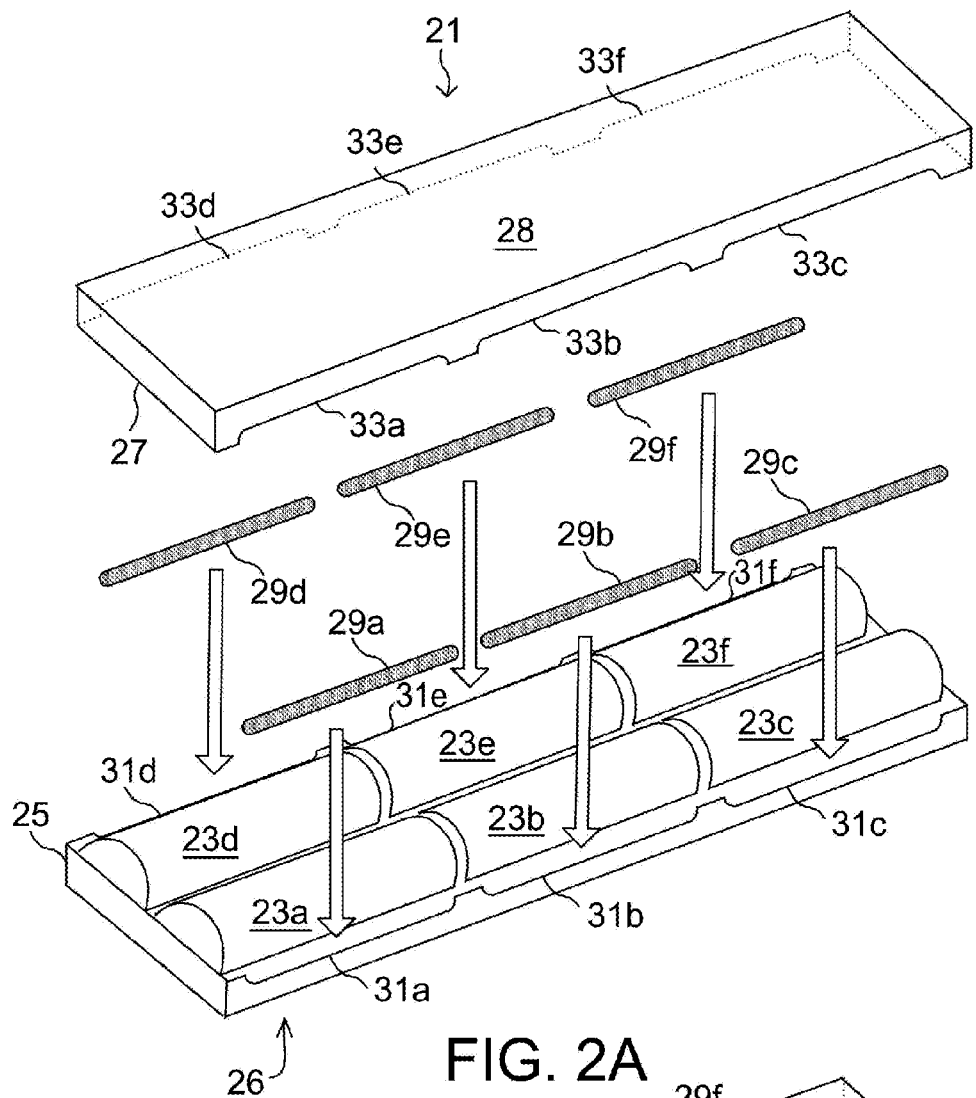
FIG. 2A is an exploded perspective view illustrating a battery pack of an embodiment of the present invention.
Figure 2B:
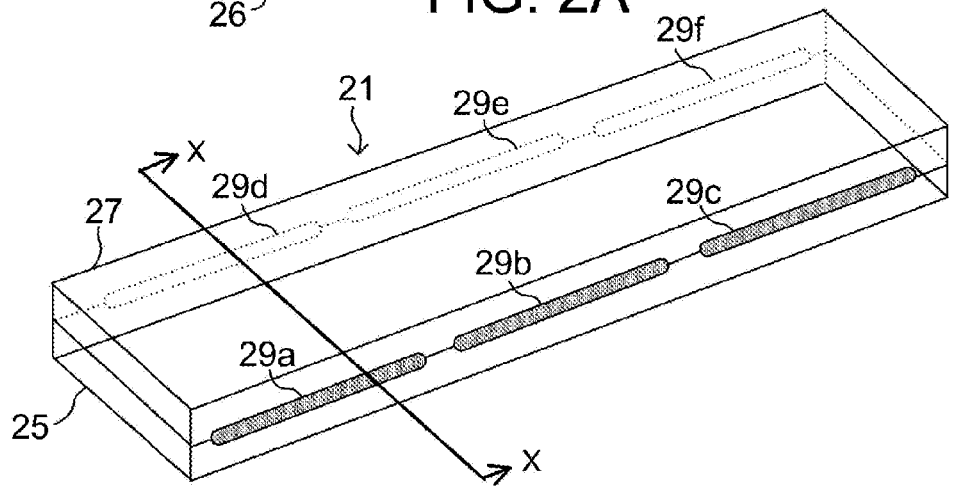
FIG. 2B is a perspective view illustrating an assembled battery pack of an embodiment of the present invention.

FIG. 2A is an exploded perspective view of an unassembled battery pack 21, and FIG. 2B is a perspective view of the assembled battery pack 21. In the battery pack 21 before assembly, an upper housing 25 accommodates six battery cells 23a-f therein, each of which is a lithium ion battery and has a cylindrical shape, and a control circuit (not shown) including a processor, a switch, and a temperature sensor. The control circuit measures and manages the state of charge and discharge. The battery cells 23a-c are connected in series and the battery cells 23d-f are also connected in series to form rows of battery cells. In addition, the battery cells 23a-c connected in series are connected in parallel to the other three battery cells 23d-f connected in series, and the output voltage is input to the control circuit. A power terminal and a control terminal (not shown) are formed on a surface of the battery pack 21 as is well known to those of skill in the art. When the battery pack 21 is housed in the battery bay 12, each of the terminals is connected to a corresponding terminal formed in the battery bay 12.

The upper housing 25 and a lower housing 27 may be formed of die-cast aluminum alloy, magnesium alloy, and the like. When the battery pack 21 is housed in the battery bay 12, a bottom surface 26 of the upper housing 25 is positioned on approximately the same plane as the bottom surface 14 of the main housing 11 and forms a portion of the outline of the body of the notebook PC 10. In addition, a part of a side surface of each of the upper housing 25 and the lower housing 27 is positioned on approximately the same plane as the side surfaces 16a and 16b of the main housing and forms a portion of the outline of the body of the notebook PC 10. When the battery pack 21 is housed in the battery bay 12, a bottom surface 28 of the lower housing and a part of a side surface of each of the upper housing 25 and the lower housing 27 faces a wall surface of the battery bay 12.

Cuts 31a-f are formed on a side wall of the upper housing 25. Cuts 33a-f are formed on the lower housing 27 at positions corresponding to the cuts 31a-f of the upper housing 25. The side wall of the upper housing 25 and the side wall of the lower housing 27 are adapted such that an edge of one side wall is inserted and fitted to the inside of the other side wall when making an approximately rectangular parallelepiped package by causing both the side wall of the upper housing 25 and the side wall of the lower housing 27 to face each other. When the upper housing 25 and lower housing 27 are fit together, six slit openings are formed along a fitting portion by means of the cuts 31a-f and the cuts 33a-f. As is apparent from FIGS. 2A and 2B, the six slit openings are arranged along the fitting portion so as to be adjacent to the battery cells 23a-f, respectively.

Caps 29a-f are formed of a fire-resistant synthetic resin, such as polycarbonate resin or an Acrylonitrile Butadiene Styrene (ABS) resin having a melting point of approximately 100° C. The caps 29a-f match the shapes of the slit openings. When the upper housing 25 and the lower housing 27 are fitted together, fixing the caps 29a-f to the cuts 3 1a-f of the upper housing 25 and matching the positions of the cuts 33a-f of the lower housing 27 on the caps 29a-f, the six slit openings are blocked by the caps 29a-f. If the slit openings are blocked by the caps 29a-f, the battery pack 21 is sealed since other vent openings are not provided. Accordingly, rain or dust will not enter and short-circuit or corrode an electrical circuit of the battery pack 21.

FIG. 3A is a side view drawing seen from a cross section taken along the line X-X of FIG. 2B. The cap 29a is arranged at a fitting portion of a side wall 25a of the upper housing 25 and a side wall 27a of the lower housing 27 to which the battery cell 23a is adjacent, and the cap 29d is arranged at a fitting portion of the side wall 25a of the upper housing 25 and the side wall 27a of the lower housing 27 to which the battery cell 23d is adjacent. FIG. 3B shows the enlarged periphery of the cap 29a of FIG. 3A. A cut 35a with a V shape cross section is formed on a battery pack side of the cap 29a. The thickness L of the cap 29a is smallest at a deepest portion of the cut 35a, and the thickness is in the range of 0.3 through 0.5 mm. A thin-walled portion is formed in the cap 29a by the cut 35a. The cap 29a easily breaches in a short period of time by a synergistic effect of temperature and pressure when the temperature and the pressure within the battery pack 21 abnormally increase. One of skill in the art will recognize that the cut 35a may be practiced with other shapes in addition to the V shape. The thickness L may be determined in response to characteristics of a battery pack 21 or characteristics of a material of the cap 29a.

Slit side walls 37a and 37b, each having a small thickness, are formed at portions where the side walls 25a and 27a of the upper housing 25 and the lower housing 27 define a slit opening. In addition, a recess having a shape fitting to each of the slit side walls 37a and 37b is formed in the cap 29a. When the upper housing 25 and the lower housing 27 are aligned to be connected, the cap 29a is fixed in place by the slit side walls 37a and 37b. After the upper housing 25 and the lower housing 27 are connected to each other, the cap 29a may be bonded to the slit side walls 37a and 37b by heat welding and the inside of the battery pack 21 is completely sealed.

The cap 29a may also be bonded to the slit side walls 37a and 37b with an adhesive. In addition, although the slit side walls 37a-b fit to the cap 29a on a longitudinal edge of a slit opening are shown in FIG. 3B, the slit side walls 37a-b and the cap 29a also fit to each other on a short-direction edge of the slit opening and bonded by heat welding. The shape and an attaching method of each of the caps 29b-f are the same as those of the cap 29a shown in FIG. 3B.

When the battery pack 21 is housed in the battery bay 12, the bottom surface 26 of the upper housing 25 and parts of the side surfaces 25a and 27a of the upper housing 25 and the lower housing 27 form a portion of the outline of the body of the notebook PC 10. Accordingly, if the notebook PC 10 mounted with the battery pack 21 falls onto a floor, an internal circuit of the battery cell 23a may be short-circuited or damaged due to the impact. As a result, the inside temperature of the battery cell 23 rapidly increases and high-temperature combustible gas is discharged from a gas discharge valve of a lithium ion battery cell. The amount of gas discharged per battery cell is approximately 1 through 2 liters, and the temperature at the time of gas discharge is in the range of 600 to 700° C.

The lithium ion battery cell 23 generally does not catch fire and explode even if placed at an environmental temperature of 150° C. for 10 minutes. However, for temperatures exceeding 150° C., gas should be discharged from a gas discharge valve of the lithium ion battery cell 23 or the battery cell 23 may catch fire. However, since the lower housing 25 and the upper housing 27 are formed of an aluminum alloy or a magnesium alloy, the lower housing 25 and the upper housing 27 do not melt or deform from gas having a high temperature such as 600 to 700° C.

Combustible gas may cause two types of fires. One type is that the gas catches fire from the spark of an electric circuit, and the other type is that the gas itself causes spontaneous combustion when the gas is held in a high temperature and high pressure. As described above, since the housing is sealed, there is a risk that the combustible gas will cause spontaneous combustion in the battery pack 21. In this case, there is a possibility that all of the battery cells 23a-f will combust, greatly increasing the temperature and pressure inside the battery pack 21. The housing of the battery pack 21 may explode, and the contents of the battery cells 23a-f will be scattered outside the battery pack 21. In order to prevent such a situation, it is necessary to prevent the inside temperature of the battery pack 21 and the gas concentration from increasing by quickly discharging gas discharged from the battery cells 23 to the outside of the battery pack 21.

FIG. 4 is a side view illustrating the behavior inside the battery pack 21 when gas 53 is discharged from the battery cell 23a. FIG. 4 shows a side surface around the cap 29a in the same cross section as FIG. 3B. The housing of the battery pack 21 is sealed. Accordingly, if the battery cell 23a explodes or a gas discharge valve operates to discharge the gas 53 from the battery cell 23a, the temperature and pressure inside the battery pack rapidly increases and the cap 29a arranged near the battery cell 23a melts at the inside temperature of the battery pack increased by the discharged gas 53. Here, since the cap 29a has a thin-walled portion formed by the cut 35a, the cap 29a is easily breached by pressure of the gas 53. Accordingly, the cap 29a is breached in a short time after discharge of the gas 53 due to a synergistic operation of the temperature and pressure of the gas 53.

If the cap 29a is breached, an exhaust port 55 for discharging the gas 53 is formed near the battery cell 23a, such that the high-pressure gas 53 is exhausted outside the battery pack 21 in a short time. Since the inside temperature of the battery pack 21 does not reach a dangerous state if the gas 53 is quickly exhausted, it is possible to prevent a fire from spreading to the other battery cells 23b-f. In addition, the cap 29a that breaches is not limited to one arranged at the position nearest to a battery cell 23 from which gas is discharged, but other caps 29 may breach depending on the temperature and pressure inside the battery pack 21.

Similar to the operation of the cap 29a described above, even when gas is discharged from the other battery cells 23b to 23f, the caps 29b-f arranged close to the battery cells 23b to 23f are breached in a short time due to the temperature and pressure and an exhaust port is formed. Accordingly, the discharged gas 53 can be immediately exhausted outside the battery pack 21. It is preferable to make the opening area of a breach opening as large as possible so that gas can be discharged in a short time. However, if the opening area of a slit opening is made large, the strength of a battery pack 21 to contain a fire inside the battery pack 21 may be decreased, increasing the risk of a battery pack 21 rupture that scatters the contents of the battery cell 23. For this reason, there is a limitation in making the breach opening area large.

In one embodiment, the sum of opening areas of slit openings is 1% or more of a surface area of a battery pack 21 including an opening area, and in a certain embodiment, 6% or more of the surface area of the battery pack. Moreover, in order to form a sufficient exhaust port close to all battery cells by means of the slit openings, the total sum of the lengths of the slit openings is preferably 50% or more of the length of the entire periphery of a fitting portion of the battery pack 21. Since the upper housing 25 and the lower housing 27 do not melt or deform due to the temperature of the gas 53 while gas is being discharged, the case or the contents of the battery cells 23a to 23f are not scattered outside the battery pack 21 even if there is an internal fire.

Figure 5A:
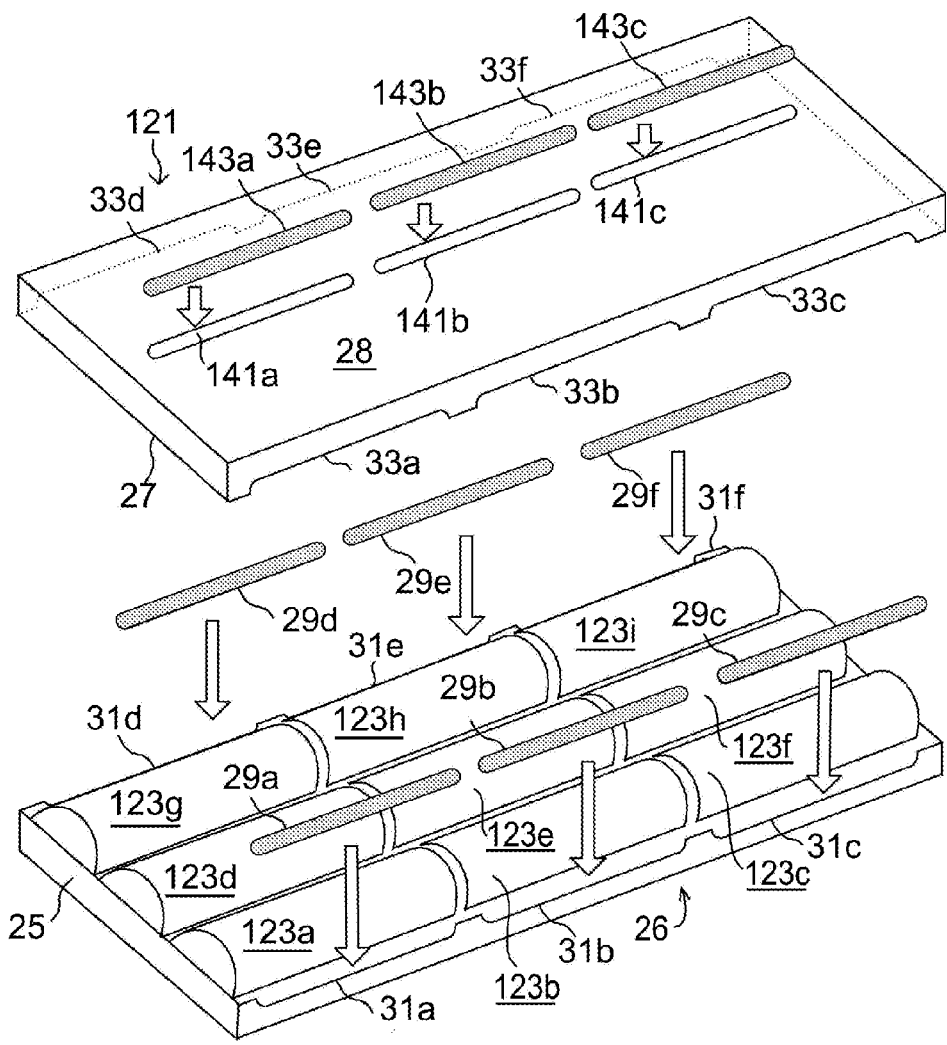
FIG. 5A is an exploded perspective view illustrating another embodiment of the battery pack of the present invention.
Figure 5B:
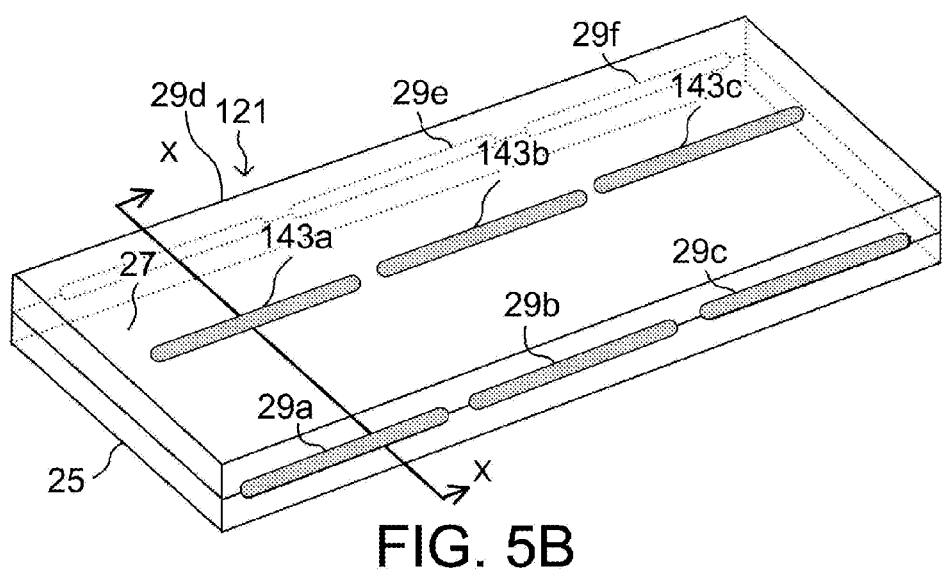
FIG. 5B is a perspective view illustrating another configuration of the battery pack of an embodiment of the present invention.

FIG. 5A is an exploded perspective view before assembly of a battery pack 121 having an alternate configuration of the present invention, and FIG. 5B is a perspective view of the battery pack 121 after assembly. The battery pack 121 is housed in the battery bay 12 of the notebook PC 10, in the same manner as the battery pack 21 shown in FIGS. 2A and 2B. However, the battery pack 121 is configured to accommodate nine cylindrical battery cells 123a-i, while the battery pack 21 is configured to accommodate the six battery cells 23a-f. In addition, the same elements described for the battery pack 21 are denoted by the same reference numerals, and a detailed description thereof will be omitted for simplicity.

The battery cells 123a-c are connected in series, the battery cells 123d-f are connected in series, and the battery cells 123g-i are connected in series to form rows of battery cells. In addition, the rows of battery cells, each of which is obtained by connecting three battery cells 123 in series to each other, are connected in parallel to each other. Accordingly, an output voltage of the battery pack 121 is equal to that of the battery pack 21, but the current capacity of the battery pack 121 is increased compared with that of the battery pack 21. On a bottom surface 28 of a lower housing 27 of the battery pack 121, slit openings 141a-c are formed at the positions close to the battery cells 123d-f. In addition, caps 143a-c fit in the slit openings 141a-c, respectively, to be bonded or heat welded to the lower housing 27.

Figure 6:
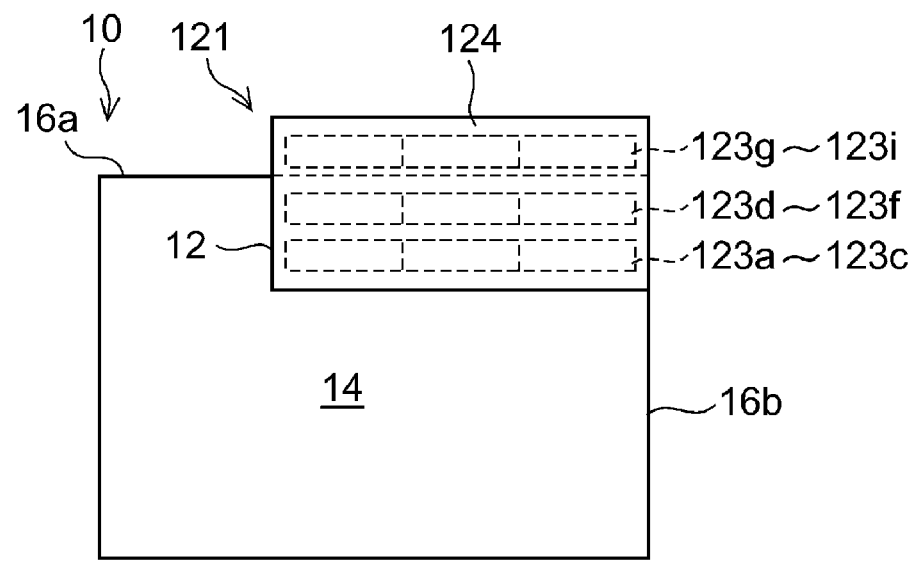
FIG. 6 is a bottom view drawing illustrating an embodiment of the battery pack of the present invention mounted in the notebook PC.

FIG. 6 is a bottom view illustrating the bottom surface 14 of the notebook PC 10 where the battery pack 121 is housed in the battery bay 12 of the notebook PC 10. When the battery pack 121 is housed in the battery bay 12, the bottom surface 14 of the main housing 11 and the bottom surface 26 of the upper housing 25 are co-planar. In addition, an extending portion 124 is located outside a plane obtained by extending a side surface 16a of the main housing 11. The extending portion 124 is a portion of the battery pack and is a portion located outside the outline of the body of the notebook PC 10. The three battery cells 123g-i are accommodated in the extending portion 124. Due to the extending portion 124, the capacity of the battery pack 121 can be increased without making the notebook PC 10 large. However, when a user drops the notebook PC 10, there is a high risk that the extending portion 124 will receive an impact that damages the battery cells 123g-i. Since the bottom surface 26 of the upper housing in which the battery cells 123a-f are accommodated also constitutes a portion of the outline of the body of the notebook PC 10 and is exposed, there is a possibility that the battery cells 123a-f will also receive an impact from the outside.

Furthermore, even if there is no impact from the outside, the temperature of any of the battery cells 123a-i may abnormally increase and combust or explode when a voltage between battery cells 123 connected in parallel becomes unbalanced thereby causing an excessive current to flow between the cells 123 or when the battery cells deteriorate and short-circuit. Accordingly, it is preferable to quickly exhaust gas outside the battery pack 121 when gas is discharged from a gas discharge valve of any battery cell 123.

Figure 7:
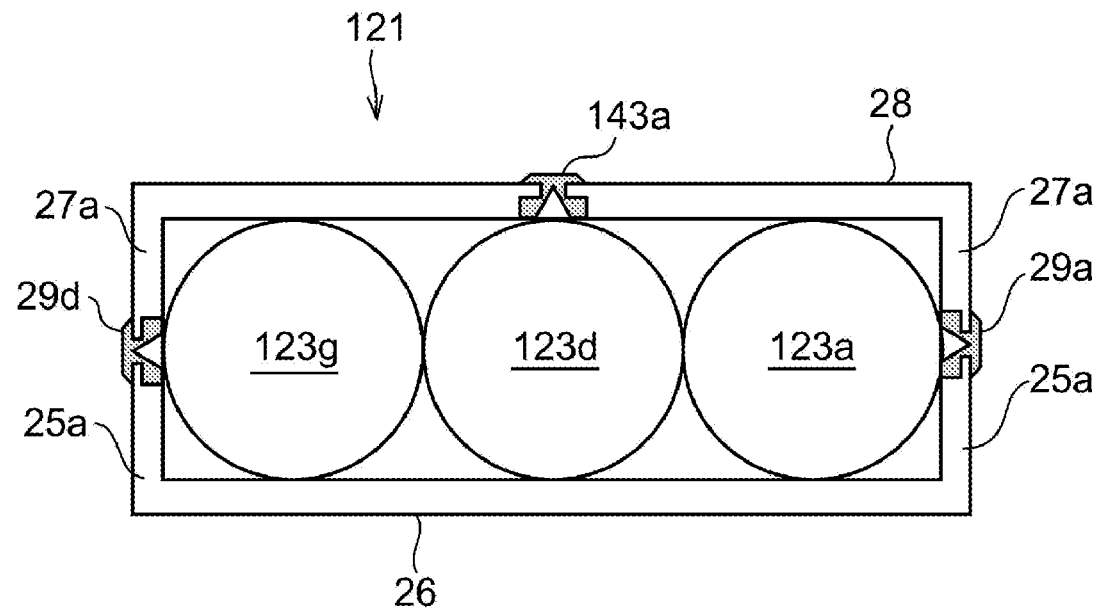
FIG. 7 is a side view illustrating another configuration of the battery pack according to an embodiment of the present invention.

FIG. 7 illustrates a cross section taken along the line X-X of FIG. 5B. In the battery pack 21, the caps 29a-f could be arranged near all of the battery cells 23a-f accommodated therein by forming the plurality of slit openings along the fitting portion of the side walls 25a and 27a of the upper housing 25 and the lower housing 27. However, since the battery pack 121 accommodates the nine battery cells 123a-i therein, there is no cap near the battery cells 123d-f. As a result, when gas is discharged from the middle battery cells 123d-f, the other battery cells 123a-c, g-I may overheat while the gas is being exhausted. For this reason, the battery pack 121 is configured such that caps 143a-c are provided at positions close to the battery cells 123d-f by forming three slit openings in the bottom surface 28 of the lower housing 27 at the positions close to the battery cells 123d-f. The caps 143a-c are also formed of a fire-resistant synthetic resin in the same manner as the caps 29a-f. In addition, at an inner side of the battery pack 121, V-shaped cuts are formed in the same manner as the caps 29a-f.

In the cross section shown in FIG. 7, the cap 29a is positioned close to the battery cell 123a and the cap 29d is positioned close to the battery cell 123g. In addition, the cap 143a is positioned close to the battery cell 123d. The cap 143a has the same operation as the caps 29a-f except that the cap 143a is attached to the bottom surface 28 of the lower housing 27. When gas is discharged from the battery cell 123d, the cap 143a is close to the battery cell 123d and is breached to form an exhaust port. Similarly, when gas is discharged from the battery cells 123e-f, the caps 143b-c close to the battery cells 123e-f are breached to form an exhaust port. As for gas discharged from the other battery cells 123a-c and 123g-i, the caps 29a-f close to the battery cells 123a-c and 123g-i are breached to form exhaust ports.

In addition, although the caps 143a-c are arranged on the bottom surface 28 of the lower housing 27 in the present embodiment, the same caps 143 may positioned close to the battery cells 123d-f on the bottom surface 26 of the upper housing 25, or caps 143 may be arranged on both the bottom surface 126 of the upper housing 25 and the bottom surface 128 of the lower housing 27. Moreover, it may be possible to form a plural number of openings having, for example, circular, elliptical, and square shapes instead of the slit openings and to block each of the openings with a blocking member.

Figure 8A:
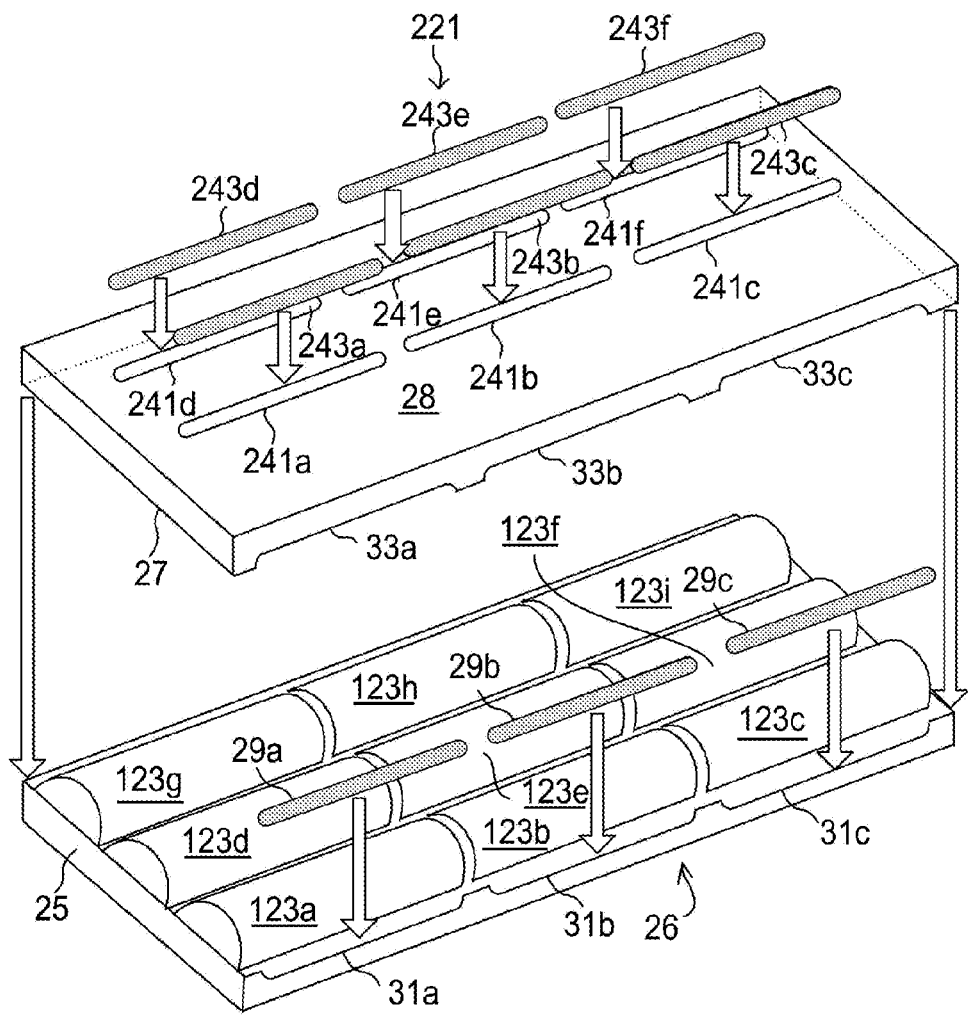
FIG. 8A is an exploded perspective view illustrating another configuration of the battery pack according to an embodiment of the present invention.
Figure 8B:
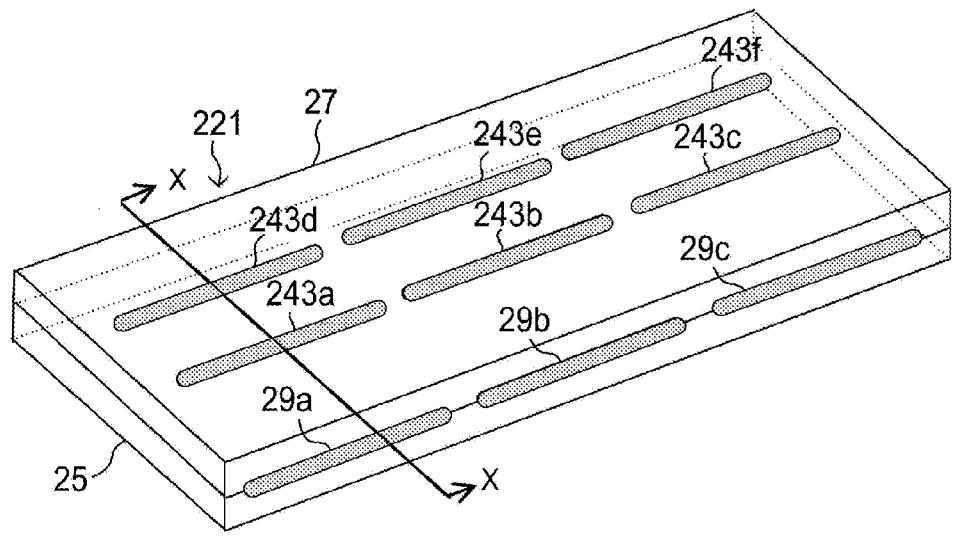
FIG. 8B is a perspective view illustrating another configuration of the battery pack according to an embodiment of the present invention.

FIG. 8A is an exploded perspective view before assembly of a battery pack 221 having still another embodiment of the present invention, and FIG. 8B is a perspective view of the battery pack 221 after assembly. The battery packs 21 and 121 have been configured such that slit openings are blocked by caps 29, 141 formed of a synthetic resin and the caps 29, 141 are breached by exhaust gas when the gas is discharged from a battery cell 23, 123. However, since the housing 11 constitutes a portion of the outline of the body of the notebook PC 10 in each of the battery packs 21 and 121, gas may diffuse around the notebook PC 10, which may not be desirable depending on the operating environment of the notebook PC 10. The battery pack 221 has a configuration which solves this problem.

The configuration of the battery pack 221 is basically the same as the battery pack 121 except that a cap is provided on a surface of a housing opposite a wall surface of N Ad the battery bay 12 without providing caps in a portion that constitutes the outline of the notebook PC 10 and an extending portion located outside the outline. The battery pack 221 has caps 29a-c at the positions close to the battery cells 123a to 123c in a portion where the upper housing 25 and the lower housing 27 fit to each other. Moreover, on the bottom surface 28 of the lower housing 27, slit openings 241a-c are formed at the positions close to a row of battery cells 123a-c and a row of battery cells 123d-f and slit openings 241d-f are formed at the positions close to a row of battery cells 123d-f and a row of battery cells 123g-i. In addition, the slit openings 241a-f are blocked by caps 243a-f, respectively.

In the battery pack 121, the caps 29d-f are present in the extending portion 124 along the fitting portion. However, in the battery pack 221, the caps 243d-f are provided on the bottom surface 28 of the lower housing 27 instead of positioning the caps in the extending portion 124. Gas discharged from the battery cells 123g-i accommodated inside the extending portion 124 is exhausted mainly due to breaching of the caps 243d-f. Gas discharged from the battery cells 123d-f is exhausted mainly due to breaching of the caps 243d-c and the caps 243a-f. In addition, gas discharged from the battery cells 123a-c is exhausted mainly due to breaching of the caps 29a-c and the caps 243a-c. Accordingly, gas discharged from all battery cells 123a-i can be exhausted from slit openings arranged at the positions close to the battery cells 123a-i. Since the battery pack 221 has the same configuration as the battery packs 21 and 121 except for those described above, the same reference numerals are used and a description thereof will be omitted for simplicity.

Figure 9:
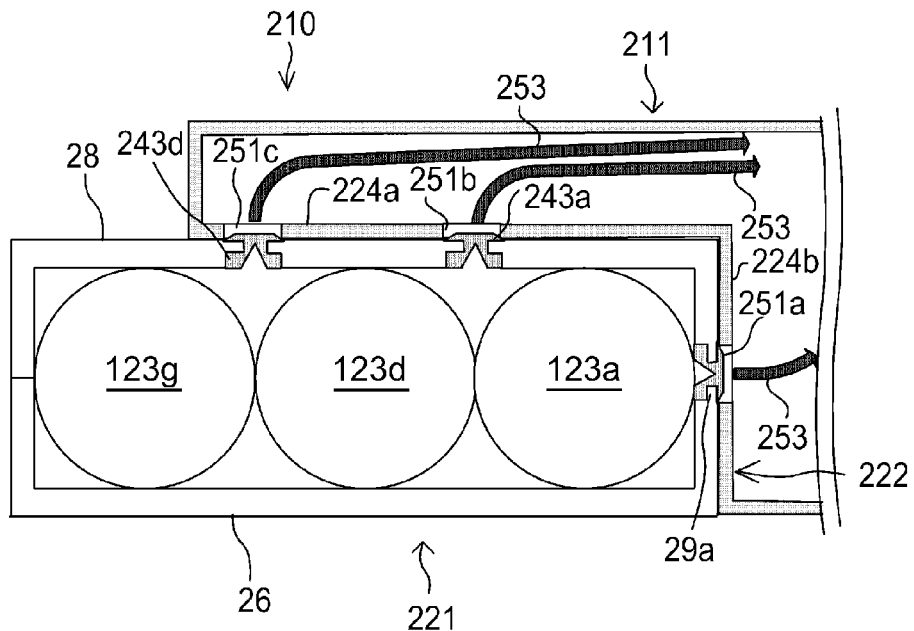
FIG. 9 is a cross-sectional view illustrating a part of a notebook PC in which the battery pack according to an embodiment of the present invention is mounted.

FIG. 9 is a side view illustrating a cross section of a battery pack 221 and a notebook PC 210 mounted with the battery pack 221. FIG. 9 shows a cross section of the notebook PC 210 on the same cross section as the cross section taken along the line X-X of FIG. 8B. A battery bay 222 is formed in a main housing 211 of the notebook PC 210. Openings 251b-c are formed in a side wall 224a of the battery bay 222, and an opening 251a is formed in a side wall 224b. In addition, the opening 251a faces a cap 29a of the battery pack 221, the opening 251b faces a cap 243a, and the opening 251c faces a cap 243d.

Similarly, openings are providing for all of the caps 29a-c and 243a-f of the battery pack 221 at the corresponding positions on a side wall of the battery bay 222. Each of the openings of the battery bay 222 allows gas 253 discharged from the battery pack 221 to be introduced inside the main housing 211, such that gas is not directly exhausted outside the main housing 11. Since the side wall of the battery bay 222 does not form the outline of the notebook PC 10 and is not exposed after the battery pack 221 is mounted in the main housing 211, foreign matter or water cannot enter into the main housing 211 from the openings 251a-c.

An electronic component which may generate a spark, such as a switch, may also be accommodated inside the main housing 211. However, since the temperature and concentration of the gas 253 introduced inside the main housing 211 decrease, a possibility that the gas 253 will catch fire is reduced. Even if the gas 253 introduced inside the main housing 211 catches fire, the magnitude of the fire is small because the temperature and concentration of the gas 253 are low. In addition, since the main housing 211 is firmly formed, there is no risk that the fire will cause spread to battery cells, cause an explosion of a battery pack 221, or the like.

Having described the slit opening as an example of a gas opening for exhausting discharged gas, one of skill in the art will recognize that the present invention may be practiced with openings of other shapes provided that gas openings are arranged near all battery cells if possible, there is sufficient mechanical strength for normal handling and when gas is discharged from a battery cell, and the contents of the battery cell are not scattered from the inside of a battery pack.

Figure 10:
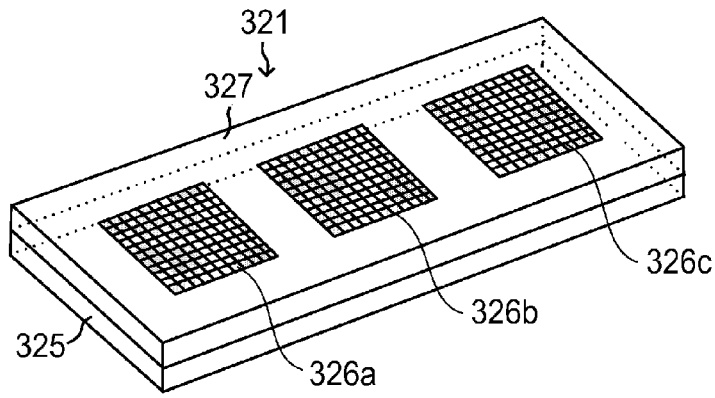
FIG. 10 is a perspective view illustrating another configuration of the battery pack according to an embodiment of the present invention.
Figure 10:
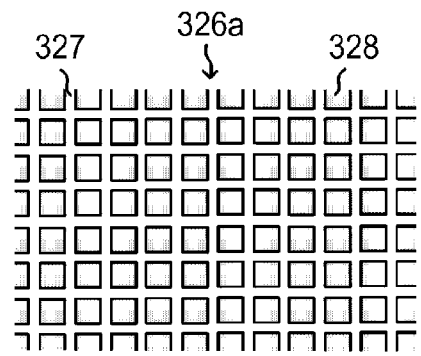

FIG. 10 is a perspective view illustrating a battery pack 321 in which mesh-like openings are formed. The battery pack 321 is formed by using an upper housing 325 and a lower housing 327, and mesh-like openings 326a, 326b, and 326c are formed as openings on a bottom surface of the lower housing. In addition, each of the mesh-like openings is blocked by a synthetic resin 328.

The above-described structure is not limited to the notebook PC 10 but can be widely applied to an electronic device to which power is supplied from a battery pack. In addition, types of battery cells used in the battery pack are not limited to the lithium ion battery. In particular, the above-described structure is effective for a battery pack which uses a battery cell that may discharge high-temperature combustible gas when damaged. A material of the housing is not limited to an aluminum alloy and a magnesium alloy as long as the material has a sufficient mechanical strength at for a temperature of gas discharged from a battery cell. In addition, materials other than the synthetic resin may also be used for caps as long as the materials seal the battery pack for normal use and melt at the temperature of gas discharged from a gas discharge valve of a battery cell.

While the present invention has been described with reference to the specific embodiment shown in the drawings, it is needless to say that the present invention is not limited to the embodiment described in the drawings but known configurations may also be adopted as long as the effects of the present invention are obtained.

The above-described battery pack can be used as a battery pack mounted in a portable electronic device. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A battery pack comprising:
a plurality of battery cells each provided with a gas discharge valve;
a housing comprising a first housing and a second housing, which accommodates therein the battery cells and has a gas opening formed as a slit along a fitting portion that joins an intersection of the first housing and the second housing, the housing not melting at an inside temperature of the battery pack increased by gas discharged from the gas discharge valve; and
a blocking member which blocks the gas opening and melts at the inside temperature of the battery pack increased by the gas discharged from the gas discharge valve, breaching the gas opening.

2. The battery pack according to claim 1, wherein the housing is in a sealed state when the gas opening is blocked.

3. The battery pack according to claim 1,
wherein the housing is formed of a material selected from a magnesium alloy and an aluminum alloy; and
the blocking member is formed of a synthetic resin.

4. The battery pack according to claim 3, wherein the synthetic resin is molded in the shape of the gas opening and is bonded to the housing by a bondant selected from an adhesive and a weld.

5. The battery pack according to claim 3, wherein the blocking member is formed with a thin-walled portion.

6. The battery pack according to claim 1,
wherein the gas opening is formed in the housing in a plural number; and
the sum of areas of the gas openings is at least one percent of the surface area of the housing.

7. The battery pack according to claim 1,
wherein the gas opening is formed in a plural number of slits; and
a total length of the plural number of gas opening slits is at least fifty percent of a length of the fitting portion.

8. The battery pack according to claim 1,
wherein the gas opening is formed on a bottom surface selected from a bottom surface of the first housing and a bottom surface of the second housings.

9. The battery pack according to claim 8, wherein the gas opening is formed in the shape of a mesh.

10. The battery pack according to claim 8,
wherein the plurality of battery cells include a row of battery cells connected in series; and
the gas opening is formed along the row of battery cells on the bottom surface of the first housing.

11. The battery pack according to claim 1, wherein the housing forms a part of an outline of a body of a portable electronic device when the battery pack is mounted in the portable electronic device.

12. The battery pack according to claim 1, wherein the housing includes an extending portion located outside an outline of a body of a portable electronic device when the battery pack is mounted in the portable electronic device.

13. The battery pack according to claim 1,
wherein the battery pack is housed in a battery bay of a portable electronic device; and
the gas opening is formed on the fitting portion opposite a side wall of the battery bay.

14. A portable electronic device comprising:
a battery bay housing a battery pack;
the battery pack comprising
a plurality of battery cells, each being provided with a gas discharge valve;
a housing comprising a first housing and a second housing and accommodating therein the plurality of battery cells and with a gas opening formed as a slit along a fitting portion that joins an intersection of the first housing and the second housing, the housing not melting at an inside temperature of the battery pack increased by gas discharged from the gas discharge valve; and
a blocking member which blocks the gas opening and melts at the inside temperature of the battery pack increased by the gas discharged from the gas discharge valve, breaching the gas opening.

15. The portable electronic device according to claim 14, further comprising an opening in a side wall of the battery bay for discharging gas.

16. The portable electronic device according to claim 15, wherein the gas opening is formed in a plural number of slits and a total length of the plural number of gas openings slits is at least fifty percent of a length of the fitting portion.

17. A battery pack comprising:
a battery bay housing a battery pack;
a plurality of battery cells each provided with a gas discharge valve;
a housing comprising a first housing and a second housing, which accommodates therein the plurality of battery cells and has a plural number of gas openings formed as slits along a fitting portion that joins an intersection of the first housing and the second housing, wherein a total length of the plural number of the gas opening slits is at least fifty percent of a length of the housing, the housing not melting at an inside temperature of the battery pack increased by gas discharged from the gas discharge valves; and
a blocking member which blocks the gas opening and melts at the inside temperature of the battery pack increased by the gas discharged from the gas discharge valve, breaching the gas opening.

18. The battery pack according to claim 17, wherein the housing is in a sealed state when the gas opening is blocked.

19. The battery pack according to claim 17,
wherein the housing is formed of a material selected from a magnesium alloy and an aluminum alloy; and
the blocking member is formed of a synthetic resin.

20. The battery pack according to claim 19, wherein the synthetic resin is molded in the shape of the gas opening and is bonded to the housing by a bondant selected from an adhesive and a weld.

* * * * *